United States Patent [19]

Ragsdale

[11] 4,171,092

[45] Oct. 16, 1979

[54] FUMIGATION SYSTEM

[75] Inventor: Robert L. Ragsdale, Holliday, Mo.

[73] Assignee: Clyde Ragsdale, Holliday, Mo. ; a part interest

[21] Appl. No.: 861,174

[22] Filed: Dec. 16, 1977

[51] Int. Cl.² .............................................. B05B 1/14
[52] U.S. Cl. .................................... 239/70; 239/550
[58] Field of Search ............... 239/70, 550, 135, 305, 239/340, 424, 266, 551, 268; 422/28, 29, 30, 31, 32, 33, 34, 35, 36, 37, 306; 169/16

[56] References Cited
U.S. PATENT DOCUMENTS

| 762,014 | 6/1904 | Wittbold | 239/550 |
| 3,587,978 | 6/1971 | Rollow, Jr. | 239/70 |
| 4,091,876 | 5/1978 | Vadatta | 169/16 |

Primary Examiner—James B. Marbert
Attorney, Agent, or Firm—Glen R. Simmons

[57] ABSTRACT

The invention relates to a system for fumigation of enclosed spaces particularly poultry houses or environments where insects have to be controlled. The system provides a timed interval automatic sprayer system using compressed air, a source of insecticide and distribution equipment including conduits, nozzles and valves for distributing the insecticide in vapor form at a relatively uniform pressure.

10 Claims, 4 Drawing Figures

FUMIGATION SYSTEM

BACKGROUND OF THE INVENTION AND OBJECTS

In the prior art systems shown in the following patents and abstract have come to the attention of applicant:

U.S. Pat. No. 3,921,904 (239-70); 3,172,604 (239-70); 1,261,122; 2,549,406 (299-58); 3,587,978 (239-550); 2,252,125 (161-7) and abstract number 773,725 (copy submitted with application). The prior art devices have consistently suffered from non-uniform pressures or from bulky non-uniform sized conduit employed in an effort to achieve uniform pressure. While numerous sprayer systems have been available in the prior art, the applicant's system has been designed to provide protection against flies at a significantly less cost than that of existing systems and at a feasible cost for poultry and livestock operations. The prior art systems have been cumbersome, ineffective and inefficient thus leaving a void in the fumigation art area which applicant's efficient and inexpensive fumigation system fills.

Accordingly, it is an object of this invention to provide a fumigation system for poultry buildings and the like.

It is a further object of this invention to provide a fumigation system for poultry buildings and the like wherein through an unique distribution system and set of components an even distribution of the insecticide spray is delivered to the desired area.

It is a further object of this invention to provide a disinsectization system including a source of pressurized air, pressure cutoff, timer, source of insecticide, distribution systems and nozzles arranged and employed in a novel manner.

A further object of the invention is to provide a novel building fumigation system including a compressed air source, solenoid cutoff of said air pressure source, a timer, a distribution system including a plurality of nozzles, lines and buckets arranged in an unique and efficient manner.

Further, an object of the present invention is to provide a disinsectization system having a substantially uniform nozzle pressure over the entire system.

A further object of the present invention is to provide a fumigation system for enclosed spaces with such system having provision for a timed distribution of insecticide at a relatively uniform pressure.

A further object of this invention is the provision of a fumigation system for enclosed spaces wherein the system employs only one size of conduit but wherein relatively uniform pressure is maintained.

GENERAL DESCRIPTION OF THE INVENTION

The fumigation system of the present invention includes a compressed air source, a pressure regulator, pressure gauge, a solenoid pressure cutoff, timer, uniform sized distribution conduit, nozzles and containers for the pesticide. The system operates to provide a fumigation system for enclosed spaces generally and poultry buildings in particular. The instant system provides a relatively uniform pressure regardless of the distance between the nozzle and the source; yet employs only line conduit of one size diameter.

DESCRIPTION OF THE PREFERRED EMBODIMENT

For a more complete understanding of applicant's invention, attention is now directed to the accompanying figures.

Figure 1:
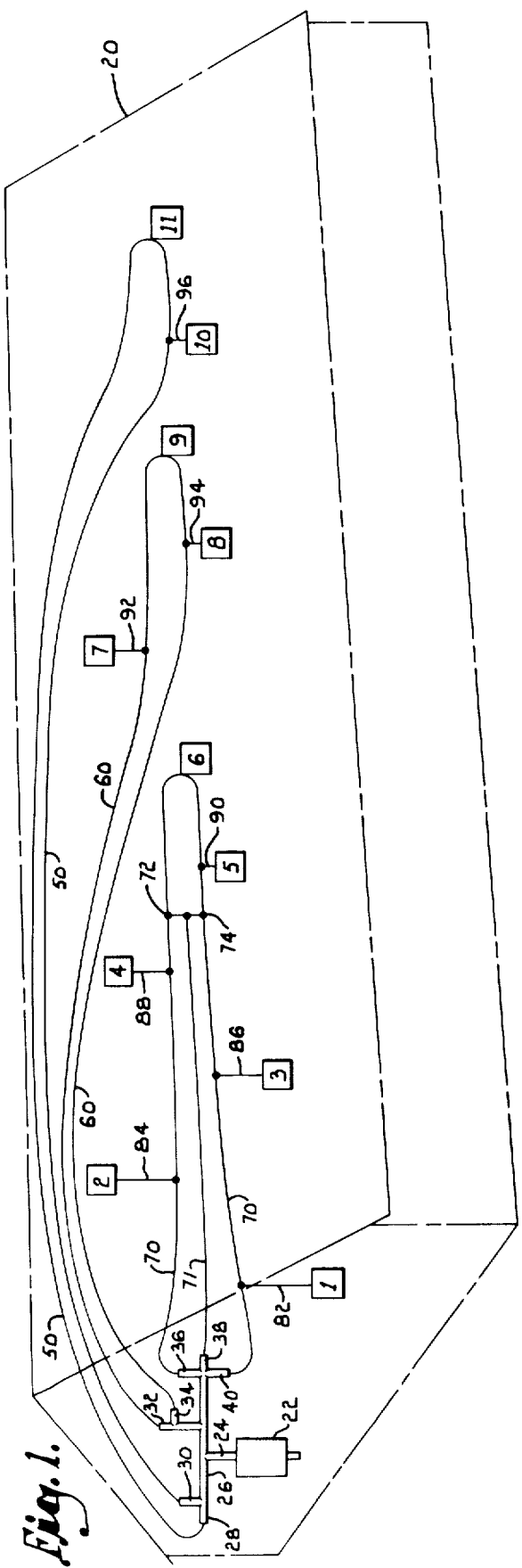
FIG. 1 is a schematic drawing of the overall fumigation system layout.

Referring specifically to FIG. 1, there is generally seen the outline of a building enclosure 20 of the type often used by poultry raisers. At the left end of FIG. 1 there is shown a rectangle 22 which depicts control panel enclosure more clearly shown in FIG. 2. Enclosure 22 serves as a housing for some control panel elements later described in connection with FIG. 2. From enclosure 22, main line 24 runs up to connect by T connection with main line 26. At the left end of line 26 there is shown two barbed connectors 28 and 30 onto which distribution line is connected. Likewise there is shown two barbed conduit connections 32, 34 approximately at the center of line 26. Similarly, at the right end of line 26 there are barbed connectors 36, 38 and 40.

Attached to barbed connectors 28 and 30 is a distribution line 50 which forms a loop i.e., it is attached to barb 28 at one end and to barb 30 at the other end. Line 50 is preferably made of polyethlene tubing and is of $\frac{3}{8}$ inch outside diameter and $\frac{1}{4}$ inch inside diameter. The line 50 has nozzle-container combination 11 connected thereto at the point most remote from barbs 28, 30 i.e., under this arrangement, near the far end of the enclosure 20. In practice, it has been found that the spray nozzles may be spread apart approximately fifty feet without sacrifice in spray coverage. Therefore, for example, nozzle 11 is located on the longitudinal centerline of the building approximately fifty feet from the right hand end of the building. Nozzle-container combination 10 is on said centerline and approximately fifty feet to the left of nozzle container 11. The building depicted in FIG. 1, for example, is approximately 600 feet in length, a length common to poultry buildings. Thus, line 50 being the longest loop of the distribution system as part of the pressure maintenance design has only two nozzles i.e., 10 and 11 as earlier described.

Similarly, one end of distribution loop or line 60 connects to barb connector 32 and the other end thereof connects to barb 34. Line 60 has connected thereto nozzle-bucket combination 7, 8, 9 as seen in FIG. 1 with nozzle 9 being located approximately fifty feet from nozzles 10 and 8 and nozzle 7 being approximately fifty feet from nozzle 8; nozzles 7, 8 and 9 being located on the centerline of the buildings as depicted. As shown in FIG. 1, nozzles 7 and 8 are connected to line 60 on opposite sides of nozzle 9. Again the latter connection arrangement helps maintain equalization of pressure among the nozzles 7, 8 and 9.

Attached to barbed connector 36 is one end of distribution line 70, the other end of which is attached to barbed connector 40. Connected to barbed connector 38 is one end of line 71, the other end of which is connected by a T connection to one side of line 70 at 72 between nozzles 4 and 6 and to the other side of line 70 at 74 between nozzles 3 and 5. Line 71 coming directly from main line 26 aids in maintenance of pressure equalization among the nozzles 1-6.

Nozzle 6 is located approximately fifty feet from nozzles 7 and 5 with nozzle 4 being positioned approximately fifty feet from nozzles 5 and 3, while nozzle 2 is positioned approximately fifty feet from nozzles 3 and 1; nozzle 1 thus being located approximately fifty feet from the left end of building 20 as seen in FIG. 1. Further, in an effort to evenly distribute nozzles 1-6, nozzles 1, 3 and 5 are connected to line 70 between barb 40 and nozzle 6 while nozzles 2 and 4 are connected to line 70 between barb 36 and nozzle 6.

Distribution lines 70, 71 and 60 are preferably all made of the same ¼ inch inside diameter, ⅜ inch outside diameter polyethylene tubing commercially available.

As noted above, the nozzles 1-11 are located along the longitudinal center line of the building for optimum spray coverage.

Further, in an effort to equalize pressure varying amounts of conduit between a nozzle and a distribution line are employed depending upon the distance said nozzle is from line 26 e.g., nozzle or spray head 1 has approximately twelve feet of conduit 82 between it and line 70; nozzle 2 has approximately ten feet of conduit 84 connected between it and line 70; spray head or nozzle 3 has approximately eight feet of conduit 86 connected between it and line 70; nozzle 4 has approximately six feet of conduit 88 connected between it and line 70; nozzle 5 has approximately two feet of conduit 90 connected between it and line 70; nozzle 6 is directly connected to line 70 as shown. Nozzle 7 has approximately four feet of conduit 92 connected between it and line 60, nozzle 8 has approximately two feet of line 94 connected between it and line 60, while nozzle 9 is directly attached to line 60. Similarly nozzle 10 has approximately two feet of conduit 96 connected between it and line 50, while nozzle or spray head 11 is directly connected to line 50. Conduits 82, 84, 86, 88, 90, 92, 94, 96 are preferably all made of the same size polyethylene tube as lines 50, 60, 70 and 71 as described hereinabove.

While for purposes of clarity, nozzles 1-11 are shown in a somewhat irregular array in FIG. 1, in practice, said nozzles are located on a fifty foot spacing on the longitudinal center line of the building in which they are employed at a convenient height approximately ten to twelve feet above the floor. Such positioning of nozzles may be altered to be used in other building designs in order to secure adequate spray coverage and yet be well within the scope of applicants invention. For example, in a one hundred foot shorter building than that described in FIG. 1, line 50 would be unnecessary. Therefore, the exact number of nozzles may be increased or decreased depending upon the building size. Further, it may be possible to locate panel 22 and lines 24 and 26 at or near the center of a building thus running conduit from panel 22 and line 26 each direction along the longitudinal center line of the building, again without departing from the scope of applicants device.

Figure 2:
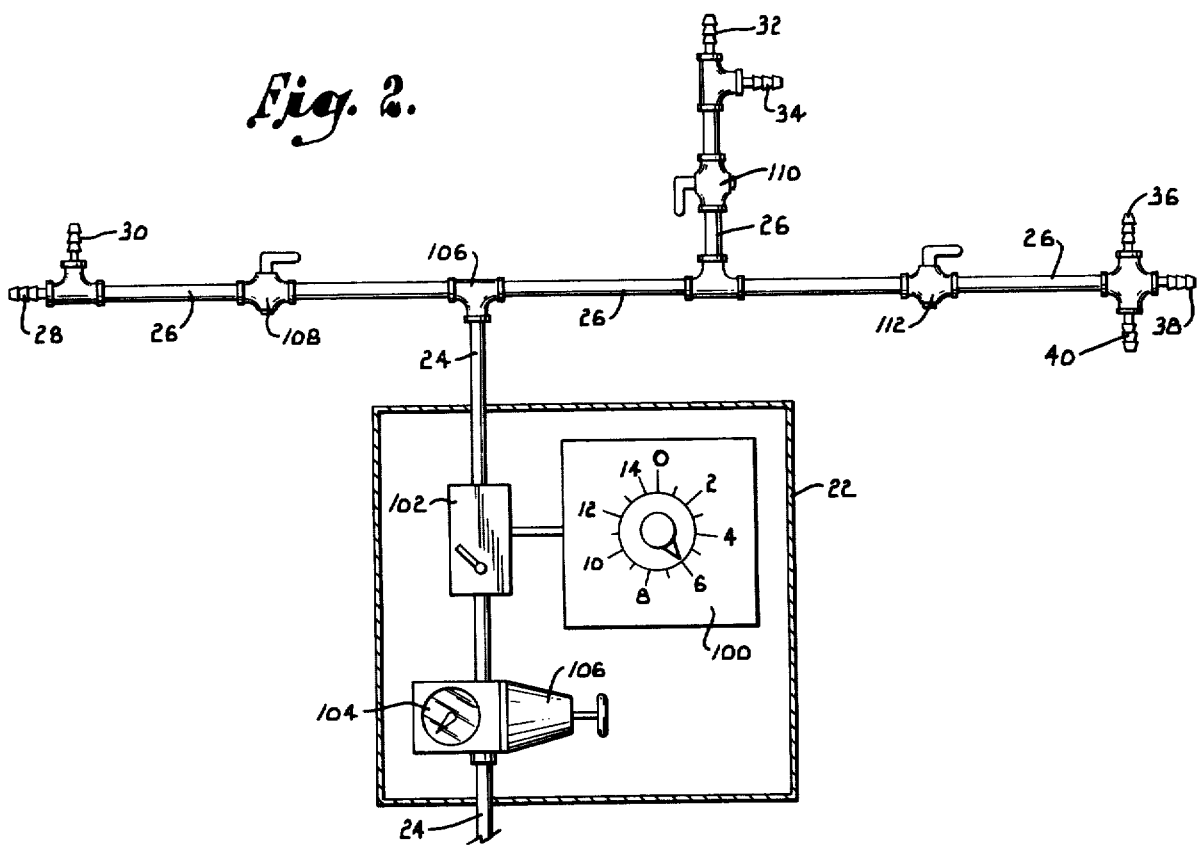
FIG. 2 is a front view of the control system of the invention.

Turning now to FIG. 2, there is shown panel 22 which includes timer switch 100 which may be of the variety manufactured by W. W. Grainger, Inc., a 15 minute timer, stock No. 2E269. Timer switch 100 is electrically connected to a solenoid operated air pressure cutoff 102 which may be of the type manufactured by the Vinson Supply Company, to-wit: ¼ inch Asco Model 8262C22, 120 VAC 60H₃ solenoid valve. Timer 100 operates to control valve 102 thus controlling the amount of time valve 102 is in an open position i.e., timer 100 may be set for a predetermined period of time as in the above example, 0-15 minutes. Upon timer 100 being set for the predetermined time period valve 102 is open for said period then closes at the end of said period. Further there is seen in FIG. 2 an air pressure gauge 104 such as that manufactured by W. W. Grainger, Inc. and may be for example a 200 ps: ¼ inch BK CON No. 4×516. Additionally, there is shown an air pressure regulator 106 such as manufactured by W. W. Grainger, Inc. and may be a 300 lb. Air Reg. ⅜ inch No. 1Z696.

Regulator 106, gauge 104 and valve 102 are connected in main line 24. Main line 24 is connected at its lower end of FIG. 2 to a source of compressed air (not shown). Above panel 22, line 24 connects by a T connection 106 to main line 26. By way of example, line 26 connects by manual turn-off valve 108 to barbed connectors 28 and 30 on the left in FIG. 2, by valve 110 to barbed connectors 32, 34 at the center top of FIG. 2 and by valve 112 to barbed connectors 36, 38, 40 on the right in FIG. 2. The barbed connectors may be of the variety sold by the Hill Dempsey Supply Company, for example ⅜ inch barbed connectors.

In the preferred embodiment, barbed connectors 28 and 30 are connected to distribution line-loop 50, connectors 32, 34 are connected to distribution line-loop 60 and barbs 36, 40 are connected to line 70 with barbe 38 connected to line 71. Barbs 28, 30 and 32, 34 may be connected in a T relationship at the end of line 26 respectively past valves 108 and 110 for further pressure equalization, if desired.

Figure 3:
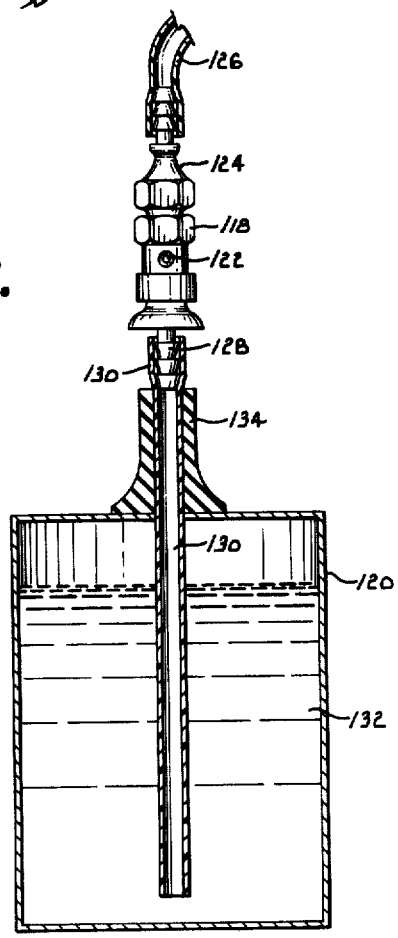
FIG. 3 is a vertical section view of a sprayer nozzle and container.

Turning now to FIG. 3, there is seen a nozzle 118 and bucket 120 combination like that of No.'s 1 through 11 in FIG. 2. Nozzle or spray-head 118 may for example be of the kind commercially available as Insectojet No. 6130 which nozzle is designed to spray in four directions when in use through orifices 122 positioned at 90° spacings around the nozzle body. Attached to the top of nozzle 118 is a barbed connector 124 like that earlier described in connection with FIGS. 1 and 2. Connected to barbed connector 124 is conduit 126 which delivers pressurized air to the nozzle 118. Conduit 126 preferably is of the ⅜" outside diameter ¼" inside diameter polyethylene tubing type earlier described in connection with FIGS. 1 and 2. As with the other tubing, e.g., 50, 60, 70, 71, tube 126 is forced onto barbed connector 124 thus providing an air-tight connection. Nozzle 118 is connected at its lower end via a barbed connector 128 and tube 130 with the interior of the pesticide bucket or container 120 and the liquid pesticide 132 contained therein. The spray-head or nozzle assembly 118 is supported above container 120 by a support element 134 through which tube 130 runs. Container or bucket 120 generally has been of the five gallon capacity but, of course, one of a larger or smaller capacity could be employed without departing from the scope of this invention.

Pesticide 132 may be Pyronyl Poultry House and Barn Fly Spray which contains by percentage the following: Pyrethrins 2%; Piperonyl, Butoxide, Tehnical 4%; N-octylbicycloheptenedicarboximide 6.66%; and Petrol distillates 87.34% in concentrated form. In practice the above pesticide is mixed and sprayed in a 1 to 4 mixture with No. 1 diesel fuel or deodorized kerosine.

Nozzle 118 operates by use of the compressed air coming through tube 126 and by siphon action through tube 130 to atomize the insecticide siphoned to the nozzle and to force the thus atomized pesticide through four orifices 122 to the space surrounding the nozzle. As noted, the passage of the compressed air from 126 into nozzle 118 through its internal structure (not shown) creates a siphon-like action which pesticide 132 from 120 into the nozzle 118 to be atomized and sprayed into the area about the nozzle. The internal structure of nozzle 118 has been omitted as it forms no part of this invention. Nozzle 118 is as noted above a commercially available item.

Figure 4:
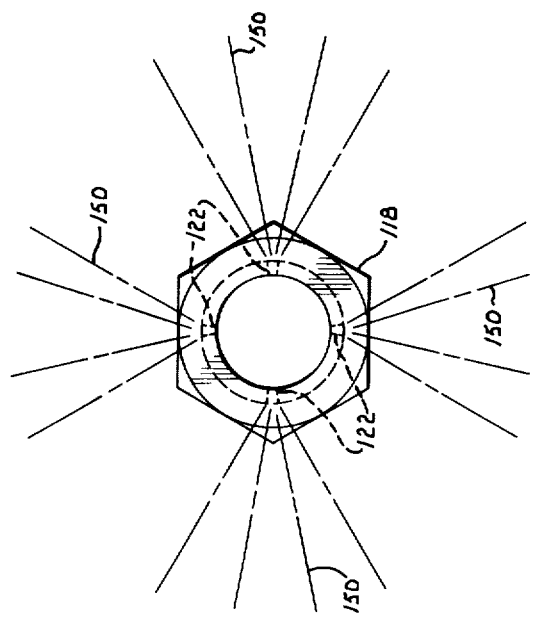
FIG. 4 is a top view of a nozzle showing the pattern of spray of the pesticide from the nozzle.

FIG. 4 shows a top view of nozzle or spray-head 118 while in operation. Thus, it can be seen that atomized pesticide 150 is sprayed from nozzle 118 through orifices 122 in four directions spaced at 90° from each other. With the above type nozzle employed, it has been found that operating with an air pressure of 80 lbs. minimum is satisfactory.

The nozzle or spray-head 118 of FIGS. 3 and 4 further includes an air strainer support (part No. 3261), a strainer body (part No. 5477), an adapter (part No. 6647-NP), a screen for the air strainer, Monel (100 mesh) (part No. 2930-100-M) and a nozzle body sub assembly (part No. 6193-NP). The foregoing parts (not shown) are available from the Spraying Systems Company and fit within the structure of nozzle 118.

OPERATION

With compressed air being supplied to main line 24 (at bottom of FIG. 2) and with pesticide present in the respective containers 120 associated with nozzles 1 through 11, when it is desired to apply the pesticide in an enclosed space as for example in poultry, cattle or other livestock buildings, the operator after having adjusted regulator 106 for the desired pressure, sets timer 100 to the desired number of minutes he wishes to fumigate the said enclosed space. Upon timer 100 being set at for example four minutes solenoid operated valve 102 is activated to an open position by an electrical signal from the timer. Upon the opening of valve 102, the compressed air passes through the upper portion line 24, line 26 through connectors 28, 30, 32, 34, 36, 38, 40 into lines 50, 60, 70 and 71 to nozzle or spray heads 1 through 11. The pressurized air passing through the nozzles draws pesticide from the respective containers into the nozzles when it is atomized and sprayed out the four orifices in each spray head to fumigate or "fog" the area around the nozzle. The spraying or "fogging" action continues until the time set by the operator on timer 100 expires, at which time the valve 102 closes and the system stops operation. The operation is then repeated when it is desired to fumigate or "fog" the enclosed space again.

The system is thus easy to operate and exceedingly effective in the fumigation of enclosed spaces. Further, the system costs only about twenty percent of the price of competing systems. A major reason that system is economical is the use of a single small sized distribution conduit in all lines of any significant length i.e., all lines of the system other than the few feet of conduit (e.g. 24 and 26) immediately associated with the control equipment. As noted hereinabove, by using a small single size in lines 50, 60, 70 and 71 as well as all lines which connect the nozzles to said lines, the system cost can be greatly reduced.

Having fully described my invention, I claim:

1. A fumigation system for dispersing pesticide comprising in combination:
   a. conduit means adapted to be connected to a source of pressurized air;
   b. valve means for controlling the flow of pressurized air in said conduit means;
   c. timing means for controlling actuation of said valve means;
   d. said conduit means having main line means and distribution line means;
   e. said distribution line means being formed in at least one loop like configuration which begins and ends in active communication with said main line means;
   f. container means for containing pesticide means said container having pesticide means therein;
   g. plural nozzle means connected by conduit to said distribution line means and to said container means; there being one container means for each said nozzle means;
   h. each said loop-like configuration distribution line which is conduit connected to more than one nozzle means being connected to its respective nozzle means by respective conduits, the length of which conduits are inversely proportional to the shortest distance along said distribution line from said main line means that said nozzle means via its respective conduit is connected;

whereby compressed air passing from said main line means via said valve means when opened by said timing means, to said nozzle means via said distribution line means enters said nozzle means and draws said pesticide means from said plural container means and atomizes and sprays said pesticide means through said nozzle means into the space surrounding said nozzle means.

2. The system of claim 1 further having regulator means for regulating the pressure of said compressed air.

3. The system of claim 1 wherein said distribution line means is formed into a plurality of loops like configuration each of which begins and ends in active communication with said main line means.

4. The system of claim 1 wherein each nozzle means has a container means with pesticide therein in proximity thereto and associated therewith.

5. The system of claim 1 wherein each said nozzle means has four spray orifices permitting the spraying of pesticide in four directions at one time from each said nozzle means.

6. The system of claim 1 wherein said timing means controls the system spraying operation for a predetermined amount of time.

7. The system of claim 1 wherein there is a plurality of nozzle means.

8. The system of claim 7 wherein said plurality of nozzle means are relatively evenly spaced along and in communication with said loop-like distribution line means configuration.

9. The system of claim 3 wherein said distribution line means further has a further conduit connection between said main line and a remote point of one of said loop-like configurations of said distribution line means.

10. The system of claim 3 wherein the loop-like configurations are of uneven length and where the number of nozzle means associated with each loop is inversely proportional to the length of the associated loop.

* * * * *